United States Patent Office 3,324,955
Patented June 13, 1967

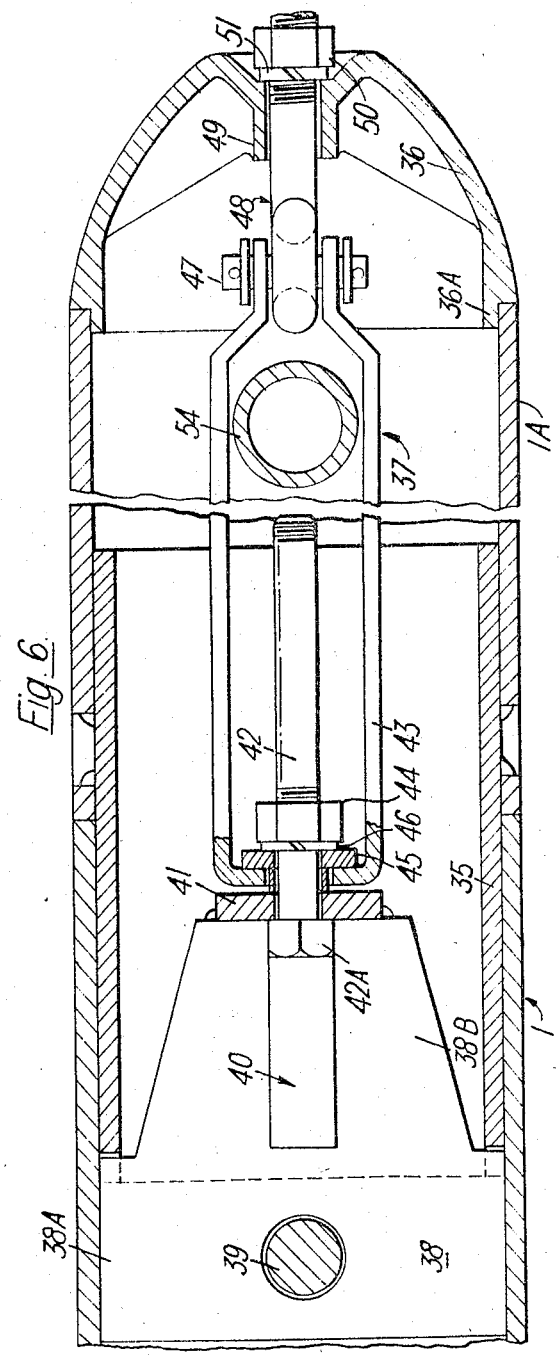

3,324,955
EARTH WORKING MACHINES
Louis Perold, Vereeniging, Republic of South Africa, assignor to South African Farm Implement Manufacturers Limited, Vereeniging, Republic of South Africa
Filed Jan. 28, 1965, Ser. No. 428,636
Claims priority, application Great Britain, Feb. 6, 1964, 5,058/64
14 Claims. (Cl. 172—136)

ABSTRACT OF THE DISCLOSURE

An earth scarifying and scraping implement including a scraper and a scarifying tool spaced fore-and-aft from each other along the body of the implement. The scarifying tool is selectively movable between earthworking and transport positions, and the scraper is rotatable about an upright axis.

This invention relates generally to earth working apparatus and is particularly concerned with apparatus capable of performing both earth scraping and earth scarifying operations.

An object of this invention is to provide a compact, integral scarifying and scraping implement in which the scraping implement may be precisely disposed in any selected one of a plurality of positions with respect to the direction of travel, and in which the scarifying implement may be easily moved from an operative, ground engaging position to an inoperative stored position out of the path of adjustment of the scraper blade.

A further object it to provide a compact, integral scarifying and scraping implement having both scarifying and scraping implements which can be alternately placed in a variety of operating positions with a minimum of effort on the part of the operator, and in which the scarifying implement can be stored in a position to permit the scraper to be freely adjusted angularly with respect to the longitudinal axis of the implement.

Still another object is to provide a combined scarifying and scraping implement having a main scarifying implement movable between a stored inoperative position, and an operative, earthworking position, and having an auxiliary scarifying implement on the scraper implement that can be selectively brought into operation by adjustment of the scraper implement.

In accordance with the invention, the main scarifying implement is mounted on a body member forward of, but near a scraper implement. The latter scraper implement is rotatably mounted on the body for angular adjustment about a vertical, or upright axis. During scraping operations, the scarifying implement is retracted to a stored, non-operating position in which it lies in a substantially horizontal plane along the longitudinal axis of the body thereby permitting the scraper to be adjusted through an angle of 360 degrees about its vertical axis of rotation.

The invention is further characterized by a rear scarifying implement carried by the scraper which may be selectively brought into operation by swinging the scraper 180 degrees from its normal position.

For leveling or smoothing operations, a retractable caster wheel may be provided on the body member at its rear for assisting in controlling the scraper depth.

Other objects, advantages and features of the invention will become apparent from the following description taken in connection with the accompanying drawings in which:

FIGS. 4, 5 and 6 are detail sectional views respectively on the lines A—A, B—B and C—C of FIG. 1.

Figure 1:
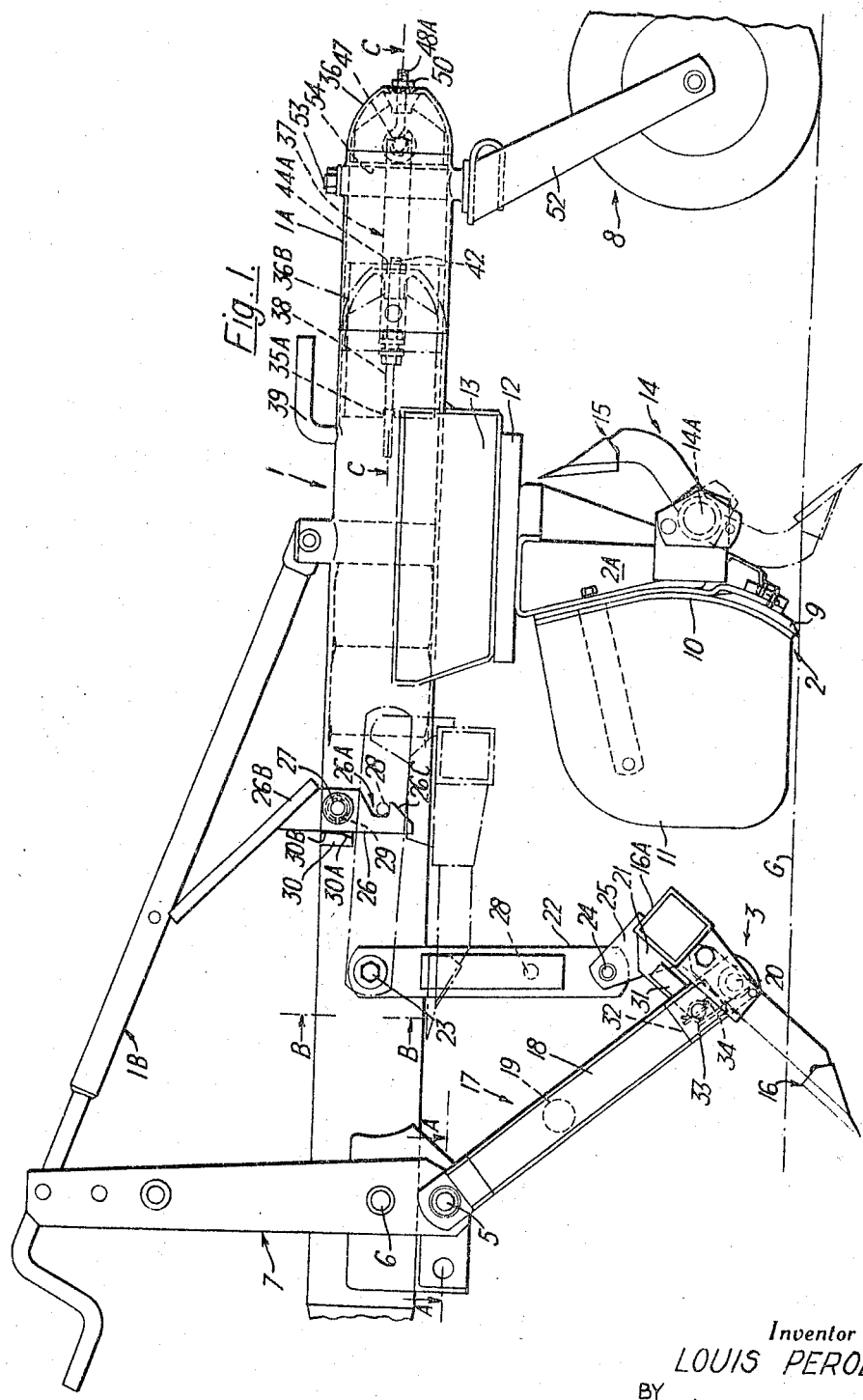
FIG. 1 is a side view of earth working apparatus according to the invention.
Figure 2:
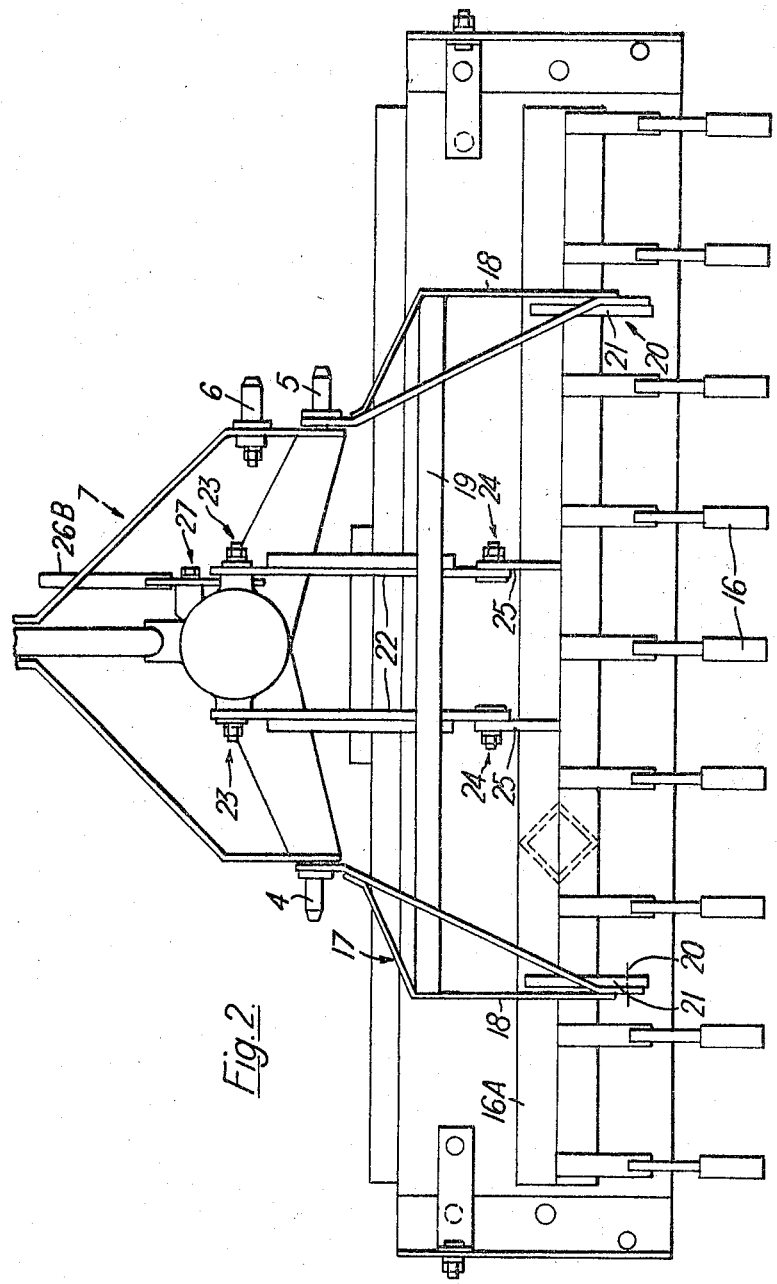
FIG. 2 is a front view corresponding to FIG. 1 to a reduced scale and showing the scarifying implement in an operative position.
Figure 3:
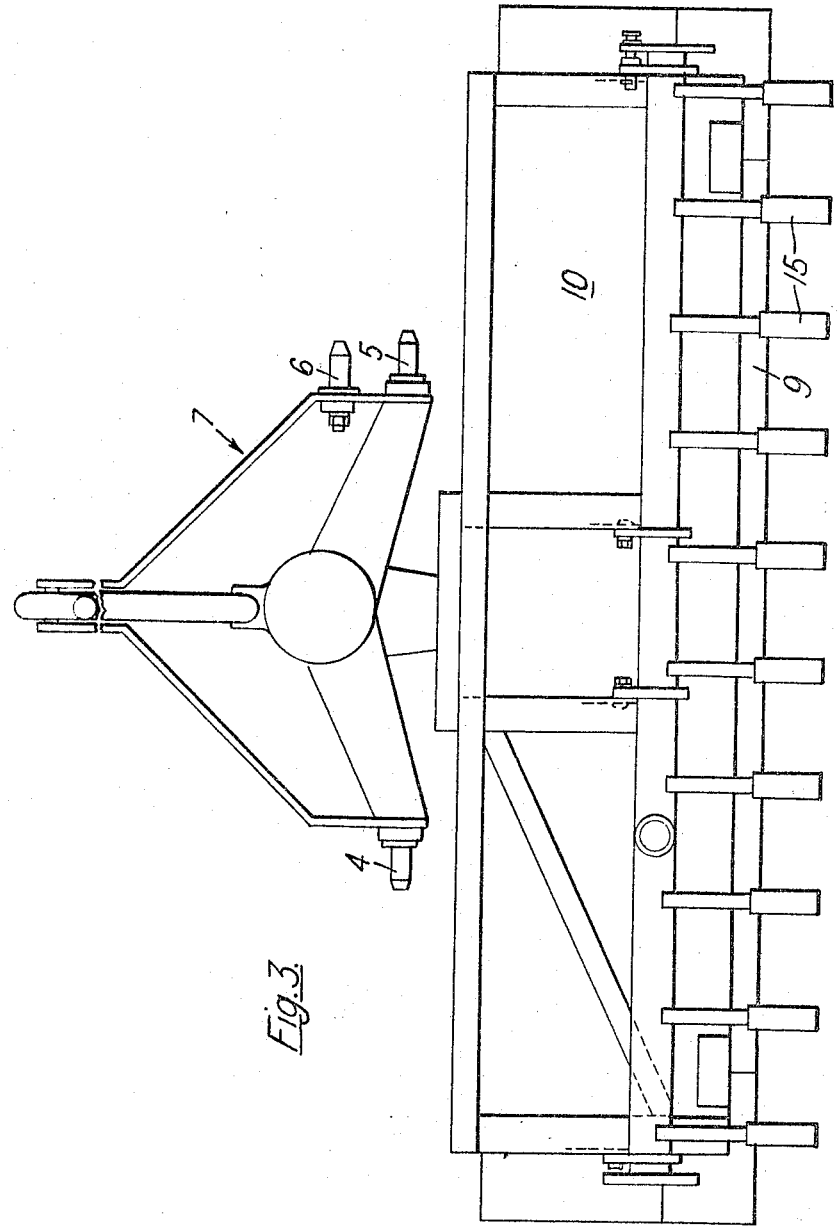
FIG. 3 is a front view corresponding to FIG. 2, showing the scraper implement and a second scarifying implement.
Figure 4:
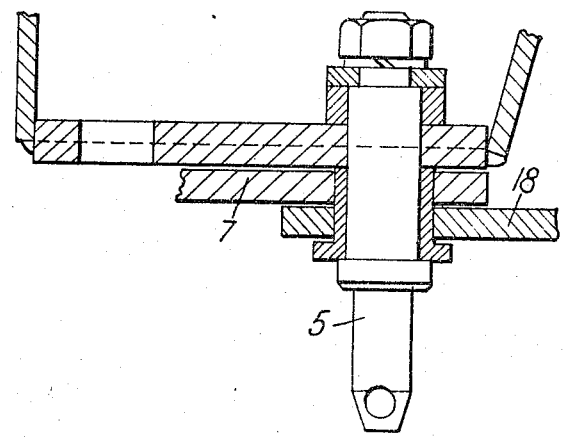
Figure 5:
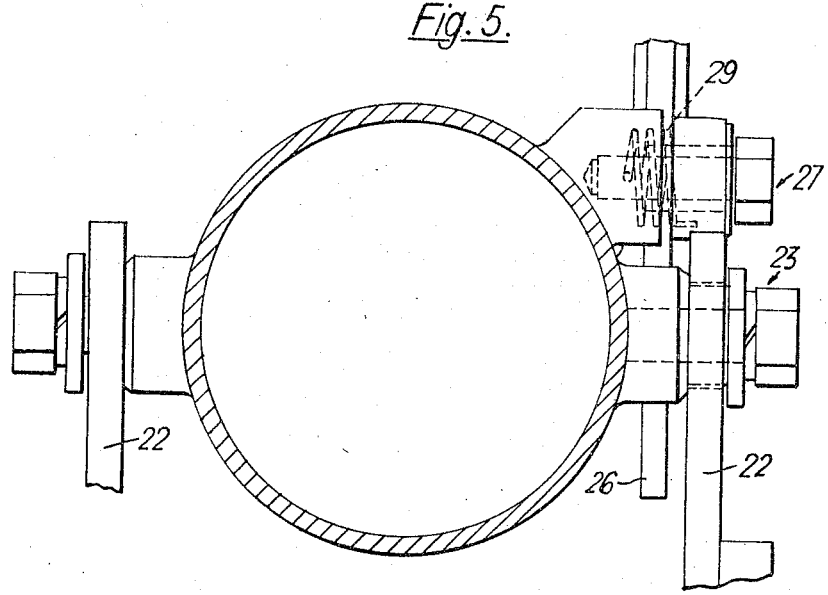

Referring to the drawings, an earthworking implement embodying the invention includes an elongated body 1 carrying a scraper implement 2 and a scarifying implement 3. The scarifying implement 3 is mounted on body 1 forwardly of the scraper implement 2.

In use, the apparatus is attached to the hitch linkage of a tractor, not shown, the lower draft links being connected to hitch pins 4 and 5, or 4 and 6, if canting is required. The pins 4 and 5 also serve to attach a frame 7 to the body 1 at the front of the latter. The top link of the tractor hitch linkage is connected to an upper part of the frame 7. At the rear, the body 1 has a caster wheel 8 which is attached by an extension 1A of the body and is swingable about the longitudinal axis of the body between a raised out-of-use position and an operative ground engaging position.

The scraper implement includes a scraper blade 9, a moldboard 10 and side wings 11 and is carried by a support 2A fixed to a plate 12 which, in turn, is rotatable about an upright axis to permit angular adjustment and reversal of the scraper implement 2. The plate 12 is rotatably mounted on a base 13 and the scraper implement 2 is held in each position to which it is adjusted by a plunger engaging one of a series of peripheral indents in the base 13 as disclosed in U.S. Patent 2,762,140, the entire disclosure of which is incorporated herein by reference. A manually operable, screw adjustable telescopic stay 1B pivotally connected to the frame 7 and the body 1 enables adjustment of the angle of attack of the blade 9 relative to the earth, and hence the penetration effect of the blade 9 to accommodate various operating conditions.

The support 2A also carries a second scarifier implement 14 of which the teeth 15 are shown in full lines in FIG. 1 in a raised out-of-use position. The teeth 15 can be swung about a transverse axis 14A to a lowered in-use position shown in FIG. 1 in chain-dotted lines when the assembly 2, 14 has been turned through 180 degrees about said upright axis from the position shown, in which the teeth 15 face in the opposite direction to that shown in chain-dotted lines in FIG. 1.

The implements 2 and 3 are mounted on the body 1 independently one of the other and are spaced apart fore-and-aft. The implement 3 has forwardly and downwardly inclined tines or teeth 16 releasably fixed to a tube 16A and a linkage system carrying the teeth 16, so that the implement 3 is movable from a working position shown in full lines in FIG. 1 to a collapsed position shown in chain-dotted lines in which it lies clear of the implement 2 when the latter is swung through 180 degrees or more to bring the reverse side of the blade 9 or the implement 14 into use, or to any of its other angularly adjusted positions.

The said linkage system has a framework 17 formed by side frames 18 interconnected by a tube 19. At one end, the upper end in the in-use position, the side frames 18 are pivotally mounted on the pins 4, 5, and at their lower or outer ends the frames 18 are pivotally connected at 20 intermediate the upper and lower ends of the implement 3 to lugs 21 fixed to the tube 16A, and the frames 18 are inclined downwardly and rearwardly in the in-use position. The linkage system also has upright links 22 pivotally connected at their upper ends to the body 1 at 23 above the level of and to the rear of the pins 4, 5 and at their lower ends at 24 to upwardly and forwardly inclined lugs 25 fixed to the tube 16A.

The scarifying implement 3 can thus be swung manually upwards to a raised collapsed position as shown in chain-dotted lines, in which it lies clear of the path of angular adjustment of the implement 2. The implement 3 can be raised manually by the operator removing the pin 33, grasping one of the teeth 16 and pushing it upwards. In this position, the teeth 16, framework 17 and links 22 lie substantially horizontally and in parallel relationship, the teeth 16 and the side frames 18 lying side-by-side and below the links 22. During raising of the implement 3, the links 22 act as guides to pivot the teeth 16 into the horizontal position.

Pivotally mounted at 27 on the body 1 is a catch 26 provided to hold the collapsed implement 3 against accidental or unintentional lowering. The catch 26 is formed with a notch 26A in which a pin 28 on one of the links 22 engages. The catch 26 is biased towards its engaged position by a torsion spring 29 and by the weight of its handle 26B, and the rear face 26C of the catch 26 is downwardly and forwardly inclined so that the pin 28 automatically deflects the catch 26 to engage the slot 26A when the implement 3 is moved to its collapsed position. The pivotal movement of the catch 26 is limited by a stop 30 on the body 1 having mutually angled faces 30A, 30B.

The lower limit position of the implement 3 may be defined, as shown, by a stop 31 above the pivot 20 on at least one of the lugs 21 abutting one of the frames 18. The stop and the frame are urged into mutual contact by the forces acting on the teeth 16 as they are drawn through the earth to maintain the implement 3 in its lowered position. The implement 3 may be positively locked in its operative position by a withdrawable pin 33 inserted through a hole in at least one of the frames 18 and a hole in the adjacent lug 21. The pin 33 is retained in position by a spring pin 34.

The apparatus may be used in various ways. For example, it can be used (1) with only the front scarifier implement 3 in the earthworking position, (2) with only the scraper implement 2 in an earthworking position, the blade facing forwardly or rearwardly, (3) with both the implements 2 and 3 in their earthworking positions, (4) with only the rear scarifying implement 14 in its earth-working position, or with both implements 3 and 14 in their earthworking positions. With regard to the implements 3 and 14, it is to be noted that the teeth 16 have a greater working depth than the teeth 15. The implement 3 can quickly be moved manually by an operator, without undue effort, between its earthworking and collapsed positions.

The wheel 8 is mounted on the body 1 by means of the detachable extension 1A as aforesaid. The extension 1A has at one end a spigot formed by a tube 35 which fits into the cylindrical socket end of the body 1, and forms a socket at its other end for a spigot 36A on an end closure cap 36. The extension 1A is held in position by a shackle generally indicated at 37 and removably anchored to the end cap 36 and to a plate 38 (FIG. 6) in the body 1. The plate 38 is located in the body 1 by a withdrawable pin 39 passing through aligned holes in the body and plate, and its forward portion 38A is a close fit diametrically of the body 1. The plate 38 has an inwardly stepped rear portion 38B having a rearwardly extending slot 40 and at its rear end has a plate 41 welded thereto and extending across the slot 40.

The shackle 37 has at its forward end a bolt 42 which passes through a hole in the plate 41 and a hole in the adjacent end of the body 43 of the shackle 37. The head 42A of the bolt 42 lies in the slot 40 and is held against rotation by the walls of the slot 40. The bolt 42 is secured to the plate 38 by a clamping nut 44 on the bolt 42, a washer 45 and a spring washer 46 being provided between the nut 44 and the end of the body 43. The spigot tube 35 has two diametrally opposed notches 35A in which the stepped parts of the portions 38A of the plate 38 engage so as to hold the body extension 1A against rotation relative to the body 1.

The body 43 of the shackle 37 is substantially U-shape and at its open or rear end has a cross pin 47 passing through opposed holes in joggled portions of the legs of the U and through the eye of an eye-bolt 48. The shank 48A of the eye-bolt 48 passes through a central sleeve 49 on the end cap 36, and a clamping nut 50 on the shank 48A clamps the end cap 36 and extension 1A to the body 1. A spring washer 51 is provided between the nut 50 and the end cap 36. The wheel 8 is carried by a fork 52 having a pin 53 which is rotatably mounted in a hollow upright post 54 passing through and secured to the body extension 1A.

The wheel 8 is normally used only during land leveling operations, and can be swung through 180 degrees about the axis of the body 1 to an out-of-use position in which it lies above the body extension 1A. This is effected by loosening the nut 50, pulling the extension 1A so that the notches 35A clear the plate portion 38A, swinging the wheel to the out-of-use position, pushing the extension inwards so as to re-engage the notches 35A and the plate portion 38A, and then tightening the nut 50. The post 54 passes through the body 43 of the shackle 37 and prevents rotation of the eye-bolt 48 when the nut 50 is being tightened or slackened.

The wheel 8 may be omitted, in which case the end cap 36 is attached directly to the end of the body 1 as indicated at 36B in FIG. 1. In this position, the bolt 42 passes through the end cap 36 and is clamped by the nut 44 as indicated at 44A in FIG. 1, the body 43 of the shackle 37, the eye-bolt 48, the nut 50 and washer 51 not being provided.

While a specific embodiment of the invention is illustrated and described herein, it will be apparent that the invention is not limited to the exact construction shown, but that various equivalents, alternatives and variations in the construction and arrangement of parts is possible without departing from the scope and spirit of the invention.

I claim:

1. Earthworking apparatus comprising a body, an earth scraping implement mounted on said body for angularly adjustable movement about an upright axis, an earth scarifying implement carried by the body and movable between a lowered operative position and a raised out-of-use position, said implements being spaced apart fore-and-aft on said body in the direction of travel, said scarifying implement in its raised position being clear of the scraper implement in any angular position thereof, and further including a linkage system interconnecting the scarifying implement with said body, said linkage system having a framework pivotally connected at one end with the body and pivotally connected at its other end with the scarifying implement, said framework being rearwardly and downwardly inclined when the scarifying implement is in its operative position, and an upright link pivotally interconnecting the body and the scarifying implement operable to pivot the scarifying implement relative to the framework as the scarifying implement moves to its raised position.

2. Apparatus as claimed in claim 1 further including an upwardly inclined lug on said scarifying implement, said link being pivoted to said upwardly inclined lug, and in which the pivotal connection between the link and the body is at a higher level than the pivotal connection between the framework and the body, so that the collapsed position the scarifying implement, framework and link lie substantially horizontally and in parallel.

3. Apparatus as claimed in claim 2, in which the scarifying implement has a stop defining the lower limit position thereof, the stop being located above the level of the pivotal connection between the scarifying implement and the framework and abutting the latter in the lower limit position so that the stop and frame are urged into mutual contact by the forces acting on the scarifying implement as it is drawn through the earth to maintain the scarifying implement in its working position.

4. Apparatus as claimed in claim 3, in which the scarifying implement has a lug, and said framework and said lug have aligned holes and further including a pin receivable in said aligned holes for locking the implement in its operative position against upward movement.

5. Apparatus as claimed in claim 4, in which said stop is mounted on said last named lug.

6. Apparatus as claimed in claim 5 in which said scarifying implement comprises a cross tube and a series of downwardly and forwardly directed teeth reelasably secured to said cross tube, and in which said lugs are carried by said cross tube.

7. Apparatus as claimed in claim 6 further including a manually releasable spring-loaded catch on the body, and in which said link has a pin which engages said catch in the collapsed position of the scarifying implement.

8. Apparatus as claimed in claim 7 in which the scraper implement is carried by a support pivotally mounted on the body about an upright axis, and further including a second scarifying implement mounted on said support for pivotal movement about a transverse axis between a lowered operative position and a raised out-of-use position.

9. Apparatus as claimed in claim 8, in which the teeth of the first scarifying implement have a greater working depht than the teeth of the second scarifying implement.

10. Apparatus as claimed in claim 9 further including a rear extension on said body, and a caster wheel mounted on said rear extension for selective rotation about said rear extension for selective rotation about said extension between an extended ground engaging position and a retracted, inoperative position.

11. Apparatus as claimed in claim 10 in which said extension includes a hollow spigot received in said socket, and further including a closure cap mounted on the rear end of said extension to cover the socket, an anchor plate non-rotatably received in said body, and a shackle connected at one end to said closure cap and at its other end with said anchor plate.

12. Apparatus as claimed in claim 11, in which said shackle comprises a substantially U-shaped body having a bolt passing through the closed end of the U along the axis of said body, and further including a slot in said anchor plate receiving the head of the bolt, and a plate secured to the anchor plate, said bolt extending across said slot and through said plate, and clamping nut on said bolt securing said U-shaped body and plate together.

13. Apparatus as claimed in claim 12 further including a central sleeve on said end closure cap, an eyebolt having its shank received in said central sleeve, and said shackle having its other end secured to the eye of said eyebolt.

14. Apparatus as claimed in claim 13 further including a hollow upright post passing through the shackle, and a fork for said caster wheel rotatably mounted in said hollow upright sleeve.

References Cited

UNITED STATES PATENTS

| 1,690,391 | 11/1928 | Williamson | 37—145 |
| 2,762,140 | 9/1956 | Elfes | 172—447 X |

FOREIGN PATENTS

| 137,087 | 5/1950 | Australia. | |

ABRAHAM G. STONE, *Primary Examiner.*

J. R. OAKS, *Assistant Examiner.*